United States Patent [19]

Vincent et al.

[11] 4,058,434

[45] Nov. 15, 1977

[54] OPACIFIED PAPER SHEET AND METHOD FOR PRODUCTION THEREOF

[75] Inventors: David N. Vincent, Glenview; Ronald Golden, Mt. Prospect, both of Ill.

[73] Assignee: Champion International Corporation, Stamford, Conn.

[21] Appl. No.: 717,175

[22] Filed: Aug. 24, 1976

Related U.S. Application Data

[62] Division of Ser. No. 508,322, Sept. 23, 1974.

[51] Int. Cl.$^2$ .......................... D21D 3/00; D21H 3/52; D21H 3/56
[52] U.S. Cl. .................. 162/165; 106/288 Q; 106/308 M; 162/166; 162/167; 252/316; 260/2.5 R; 260/2.5 F; 260/29.4 R; 428/306; 428/327; 428/402; 428/530
[58] Field of Search ................... 162/162, 164 R, 165, 162/166, 167; 252/316; 106/288 Q, 308 M; 260/2.5 R, 2.5 B, 2.5 F, 2.5 L, 29.4 R; 428/306, 327, 402, 526, 530

[56] References Cited

U.S. PATENT DOCUMENTS

| | | | |
|---|---|---|---|
| 2,776,267 | 1/1957 | Weber et al. ........................... | 260/21 |
| 3,256,219 | 6/1966 | Will .................................. | 260/2.5 R |
| 3,371,053 | 2/1968 | Raskin ............................. | 260/2.5 B |
| 3,516,846 | 6/1970 | Matson ........................... | 162/166 X |
| 3,516,941 | 6/1970 | Matson ........................... | 162/162 X |
| 3,539,465 | 11/1970 | Hiestand et al. ...................... | 252/316 |
| 3,585,149 | 6/1971 | Vassiliades et al. ............. | 162/162 X |
| 3,615,972 | 10/1971 | Morehouse et al. .......... | 260/2.5 B X |
| 3,669,899 | 6/1972 | Vassiliades et al. ................. | 252/316 |
| 3,720,579 | 3/1973 | Vassiliades et al. ............. | 162/165 X |
| 3,734,867 | 5/1973 | Will .................................. | 260/2.5 R |
| 3,779,957 | 12/1973 | Vassiliades et al. ............. | 162/162 X |
| 3,781,230 | 12/1973 | Vassiliades et al. ............. | 162/162 X |
| 3,784,391 | 1/1974 | Kruse et al. ................... | 260/2.5 B X |
| 3,822,181 | 7/1974 | Vassiliades et al. ................. | 162/162 |
| 3,849,378 | 11/1974 | Griffiths et al. ................. | 162/166 X |
| 3,909,348 | 9/1975 | Economou et al. .................. | 162/166 |
| 3,928,272 | 12/1975 | Brancato et al. ................ | 162/166 X |
| 3,953,421 | 4/1976 | Berstein ....................... | 106/288 Q X |

Primary Examiner—Arthur L. Corbin
Attorney, Agent, or Firm—Roylance, Abrams, Berdo & Kaul

[57] ABSTRACT

Opacifying agents, which may be coated onto or incorporated into paper sheets, consisting essentially of spherical aldehyde condensation polymeric super-particles, each having a spherical, discontinuous shell surrounding a spherical hollow core, said shell composed of agglomerated, discrete spherical aldehyde condensation polymeric secondary particles which are solid throughout. The opacifying agents are incorporated into paper sheets by admixing cellulosic fibers with the super-particles.

24 Claims, 3 Drawing Figures

OPACIFIED PAPER SHEET AND METHOD FOR PRODUCTION THEREOF

This is a division of application Ser. No. 508,322, filed Sept. 23, 1974.

This invention relates to a process for the preparation of opaque, substantially spherical, microscopic opacifying particles, and to the particles produced by such process. More specifically, this invention relates to the preparation of opaque, substantially spherical particles formed of a formaldehyde condensation product and to spherical agglomerates having an unusually high opacifying ability.

The preparation of microscopic particles formed from natural and synthetic polymeric materials has been described, for example, in U.S. Pat. No. 3,585,149 and U.S. Pat. No. 3,669,899 to A. E. Vassiliades et al. The opacifying agents described in the Vassiliades et al patents comprise discrete, air-containing microcapsules having substantially continuous, solid walls, and an average particle diameter in the below 2 micron range. Generally, the microcapsules described in the aforesaid patents are formed by preparing an oil-in-water emulsion and coating the emulsion droplets with a film-forming material, which is subsequently hardened. The oily core material is expelled from the microcapsules to form air-containing microcapsular opacifying agents. The expulsion of the oily material from the microcapsules is accomplished by heating the microcapsules, for example, after the capsules have been coated by means of an aqueous dispersion onto a paper substrate. Alternatively, the oily core material may be expelled by subjecting the capsules to a spray-drying operation under relatively high temperature conditions. In any case, the expulsion of the oily material presented a number of difficulties. For example, one problem faced by the operators of such a system is that of the care necessary to insure that all of the oil is completely expelled from the capsules. This was generally time consuming and required relatively severe temperature conditions. Additionally, there is the problem of oily solvent recovery, which is both an environmental problem as well as an economic one. Thus, some of the oily solvent materials employed are fairly toxic and could endanger the health of the operators of the paper machine dryers. Additionally, a substantial portion of the oily material is lost to further use in the system using the evaporative recovery systems employed. Such losses, of course, play a role in the economics and commercialization of such systems.

It has now been discovered that opaque, microscopic, pigment particles may be produced in a system which avoids many of the drawbacks of the aforesaid systems utilized in the production of microcapsular opacifying agents. Thus, it has been discovered that opaque, substantially spherical particles may be produced by a process which comprises admixing an aqueous, partially condensed, aldehyde condensation product with an oily material containing an emulsifying agent thereby forming a water-in-oil emulsion. Thereafter, an amphiphillic acid catalyst is admixed with the emulsion and the condensation product is polymerized, thereby forming substantially spherical, solid, opaque polymeric particles.

According to one aspect of the present invention, the polymerized particles are separated from the bulk of the oily material and admixed with an aqueous liquid, preferably water, under increased temperature conditions in order to remove the remainder of the oily material from the particles and form microscopic agglomerates of said substantially spherical particles, which agglomerates have an unexpectedly high opacifying power.

A further aspect of the present invention involves the formation of agglomerates having substantially spherical walls, which walls are formed of substantially spherical, microparticles.

The process of the present invention avoids many of the drawbacks of the previous systems wherein an oil-in-water emulsion is formed, since the system of the present invention permits the easy separation and recovery of the oily material by simple centrifugation or distillation, rather than solent evaporation. Thus, the oily material of the present invention may be easily and readily recycled back to the emulsification operation thus providing both safe handling and an economic system.

According to a preferred aspect of the present invention, the microparticles are provided by a process which comprises forming a prepolymer of urea and formaldehyde and admixing an aqueous solution of the prepolymer with an oily material containing an emulsifying agent. A water-in-oil emulsion is thereby formed and an amphiphilic acid catalyst is admixed with the emulsion causing the prepolymer to polymerize. The resultant particles are admixed with an aqueous liquid, such as water, under conditions of brisk agitation while heating the particles to remove residual oily material. Optionally, the particles may be separated from the aqueous liquid.

An additional understanding of the invention will appear from the following description and the drawings in which:

FIG. 2 is a surface view.

Figure 1:
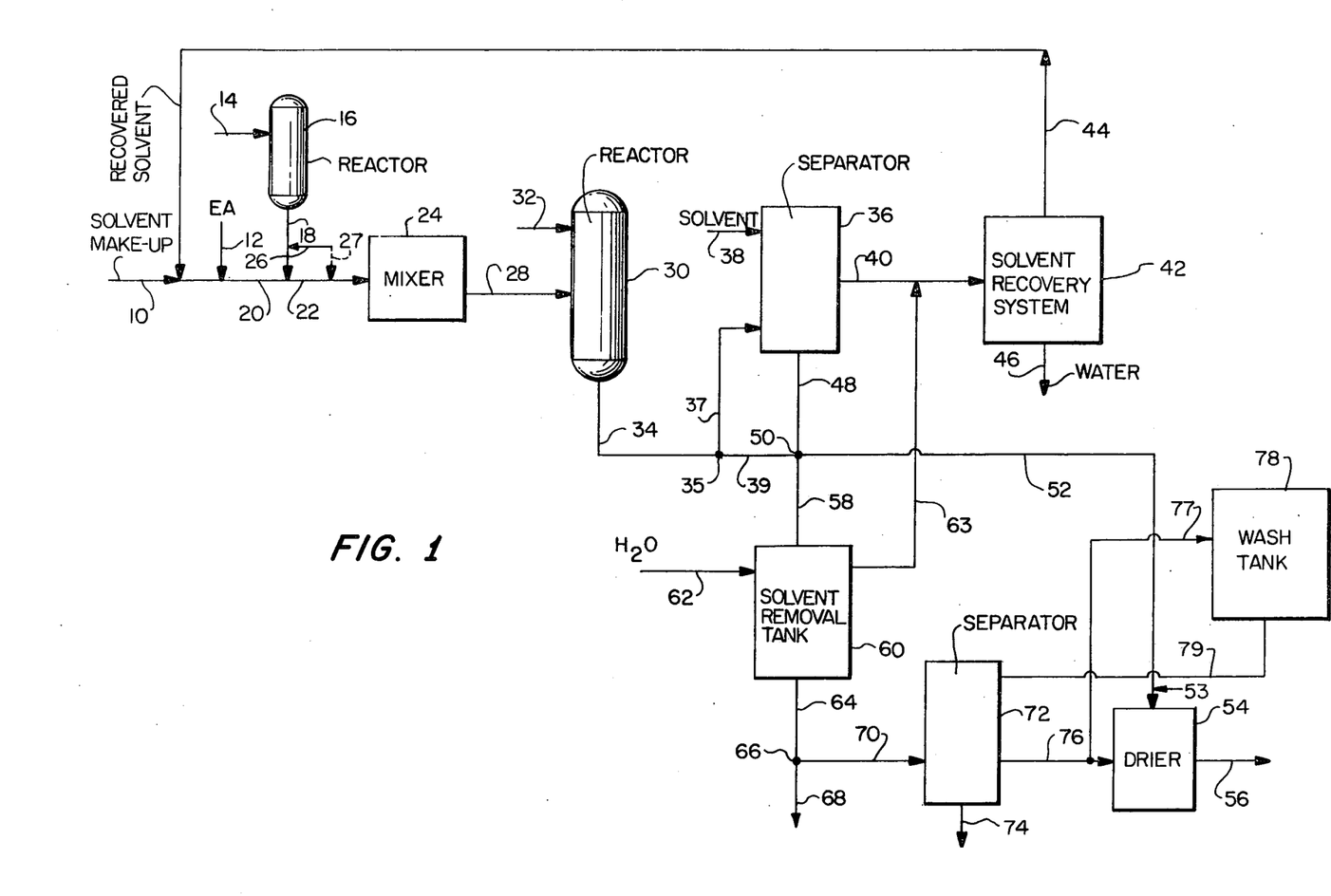
FIG. 1 is a flow sheet outlining a general procedure for carrying out the invention.

Referring now to FIG. 1, a water-immiscible oily liquid is introduced by means of line 10 for admixture with recycled oily material and a surface-active emulsifying agent 12. Suitable water-immiscible oily materials for use in the present invention include, for example, any organic solvent capable of acting as the continuous phase of a water-in-oil emulsion. Suitable solvents include aliphatic and aromatic solvents, such as petroleum ethers, naphthas, mineral spirits, toluene, xylene, turpentine or the like. Similarly, ketones, esters, halogenated hydrocarbons etc., may be suitably utilized in the process of the present invention. The preferred solvents are those having a relatively low cost and a low toxicity, such as mineral spirits or xylene.

The emulsifying agent is admixed with oily material in amounts sufficient to provide, for example, between about 0.005 and about 0.2 part by weight of emulsifying agent per part of oily material, preferably between about 0.02 and about 0.08 part per part of oily material.

Suitable surface-active emulsifying agents are those capable of promoting the formation of a water-in-oil emulsion. Such materials include, for example, lanolin, lanolin derivatives, sorbitan monooleate, polyol oleates, ethylene oxide adducts of fatty acids, fatty alcohols, fatty amines and fatty amides, cholesterol derivatives, fatty acid diethanol amides, ethylene oxidepropylene oxide block copolymeric condensation products and the like, such surface-active agents being well known in the art. The preferred emulsifying agents are the ethylene oxide-propylene oxide block copolymeric condensation products commercially available from BASF-Wyandotte Corporation under the names "Pluronic" and "Tetronic."

Meanwhile, a urea-formaldehyde prepolymer is provided by introducing urea and formaldehyde by means of line 14 into reactor 16 at a mole ratio of formaldehyde to urea in the range of between about 1:1 to 2.5:1, preferably between about 1.2:1 and 1.5:1. The reaction takes place in an aqueous solution at about 50% solids, at a pH of 9–10, and a temperature between about 50° and 120° C. The reaction time is controlled so as to produce a substantially clear prepolymer solution when the reaction mixture is cooled to room temperature. Such reactions are well known in the art. Although the foregoing discussion has been directed towards a urea-formaldehyde prepolymer, any suitable partially condensed aldehyde condensation product may be employed for the formation of an internal phase of the emulsion. Accordingly, for example, any carbamide-aldehyde condensation product that is compatible with aqueous solution polymerization is suitable for use in the present invention. Accordingly, other acid or base-catalyzed co-reactants may be employed including condensation reaction products of formaldehyde with phenols, such as, hydroxybenzene (phenol), m-cresol and 3,5-xylenol carbamides, such as, urea; triazines, such as, melamine; amino and amido compounds, such as, aniline, p-toluenesulfonamide, ethyleneurea and guanidine; ketones, such as, acetone and cyclohexanone, or combinations of these materials, with the provision that the prepolymer be insoluble in the water-immiscible phase. Additionally, the prepolymer may be provided in any suitable aqueous medium including water, glycerol, poly(ethylene oxide), glycols, or the like, may be suitably employed. Ureaformaldehyde is the preferred prepolymer. However, the substitution of melamine for 1 to 2% by weight of urea provides a prepolymer with better storage stability. The expression "prepolymer" as utilized herein is intended to mean the initial, water soluble, reaction product of the carbamide and the aldehyde. In the case of urea and formaldehyde, the prepolymer includes methylol ureas and the oligomers of methylol ureas.

The prepolymer in the aqueous medium is withdrawn from the reactor 16 by means of line 18 and admixed with the water-immiscible solvent-emulsifying agent mixture in line 20, and the resulting admixture is passed by means of line 22 into mixer 24 wherein a water-in-oil emulsion is formed under conditions of brisk agitation. The water-in-oil emulsion may be prepared batch-wise, utilizing a tank with a high shear agitation, or continuously by combining the oil and water phases into an in-line mixer, e.g., a Homomixer or Sonulator. Preferably, the agitation is conducted in a manner such that the emulsion droplets have an average particle diameter below about 5 microns, preferably in the range of between about 0.5 and about 2 microns. Alternatively, a suitable inorganic opacifying pigment, such as $TiO_2$, $Al_2O_3$, barytes ($BaSO_4$), clay, ZnO, $Ca(SO_4)_2$, talc, and the like may be provided in the emulsion. Preferred inorganic pigments for the purpose of the present invention are $TiO_2$, $Al_2O_3$, $BaSO_4$, clay and ZnO, with $TiO_2$ being especially preferred.

The addition of the inorganic pigment particles by means of line 26 results in the incorporation of the pigment into the ultimate structure of the opacifying particles of the present invention. Alternatively, the inorganic pigment may be added to the emulsion by means of line 27 where it migrates to the oil/water interface. When the particles of the present invention are ultimately formed, as thereinafter described, the inorganic opacifying pigment becomes incorporated in the polymeric structure at a point depending upon its position during the polymerization step. e.g., at the particle-solvent interface or homogeneously distributed throughout the polymer phase.

Although it is possible to incorporate an inorganic pigment particle into the structure of the polymeric particles of the present invention, highly opaque particles may be provided in the absence of such inorganic pigment particles. Accordingly, since the resulting polymeric pigment is opaque and not transparent, the practice of the present invention may be conducted without the use of the aforesaid inorganic opacifying pigments.

The ratio of the internal, aqueous phase, to the external, water-immiscible solvent phase, is preferably in the range of between about 0.4 and about 3 parts by weight, preferably between about 1 to 2 parts by weight of the internal phase per part by weight of the external phase. Although it is possible to utilize a higher ratio of internal to external phase, it is preferred to use an approximately 2 to 1 ratio. The resulting emulsion that is withdrawn from the mixer 24 by means of line 28 has a viscosity in the range of between about 2 and 2000 centipoises. Preferably, the viscosity of the resulting emulsion is low and water-like.

Next, the emulsion is introduced to the polymerization reactor 30 along with an amphiphilic, acidic polymerization catalyst, having an ionization constant greater than about $10^{-4}$, which is introduced by means of line 32. Suitable polymerization catalysts for the purpose of the present invention include, for example, polymerization catalysts that are soluble in the continuous oily phase, but which have a significant affinity for the internal, or water phase, such as anhydrous hydrochloric acid, $SO_2$, $SO_3$, $BF_3$, $BF_3$ etherate, titanium tetrachloride, phopshoric acid, phosphorous pentachloride, silicontetrachloride, phosphorous trichloride, sulfuryl chloride, and the like; organic carboxylic acids such as formic acid, acetic acid, trichloroacetic acid, and the like; alkyl acid phosphates, such as monoethyl acid phosphate, monoamyl acid phosphate, monobutyl acid phosphate, diethyl acid phosphate, and the like; substituted sulfamic acids, etc. Preferably, the acid catalyst is employed in amounts necessary to bring the final pH of the prepolymer phase to a pH of between about 0.5 and about 4, preferably between about 1 and about 2.

The catalyst is added at about ambient temperatures under mild agitation, preferably in the temperature range of about 10° to about 25° C. The polymerization reaction is exothermic, resulting in a temperature rise, so that the polymerization reaction occurs at temperatures in the range of between about 30° and about 70° C, preferably in the range of between about 40° and about 50° C. Since the acid-catalyzed condensation polymerization is exothermic, cooling means (not shown) must be utilized in connection with reactor 30 in order to keep the polymerization temperatures in the preferred range. Accordingly, costly heating means for reactor 30 are not needed. The polymerization reaction is conducted for between about 0.25 and about 4 hours, preferably between about 0.5 and about 2 hours.

As employed herein, the term "amphiphilic catalyst" means that the catalyst possesses at least some significant affinity for both the aqueous and the oily phase of the emulsion, and thus is neither completely hydrophilic nor completely lipophilic. The employment of an amphiphilic polymerization catalyst permits the addition of said catalyst after the formation of the emulsion, since it is capable of passing through the continuous solvent phase to the water-oil interface, effectively catalyzing the polymerization of the urea-formaldehyde. Thus, the use of such catalysts permits the control of the emulsification operation including the emulsion droplet size without concern of any premature gelling, which might occur if a catalyst were introduced into the prepolymer solution before emulsification. Another advantage of using such a catalyst is that it will not prematurely precipitate any added inorganic opacifying pigments, such as titanium dioxide, out of the suspension in the prepolymer solution, which could occur if a water-soluble acid polymerization catalyst were added along with the aqueous, internal phase prior to the formation of the emulsion.

A dispersion of the polymerized urea-formaldehyde particles and water droplets in the water-immiscible oily solvent, i.e., a "solvent dispersion," is withdrawn from reactor 30 by means of line 34 and passed to a vessel 36 by means of valve 35 and line 37. In vessel 36 the solvent dispersion is separated into a substantially clear supernatent phase comprising the oily solvent, e.g., xylene, and most of the emulsifying agent. This phase is removed from vessel 36 by means of the line 40. The remaining phase is a heavy phase which comprises residual solvent and the solid polymer particles. The heavy phase is termed an "inverted sludge" phase, since the system fed to the vessel 36 has been in the form of a water-in-oil emulsion, and the system has now inverted to an oil-in-water emulsion.

The phase separation in vessel 36 may be accomplished by various means including heating the solvent dispersion to a temperature, for example, in the range of between about 35° and about 70° C, preferably between about 40° and about 50° C. Alternatively, the solvent dispersion may be subjected to direct centrifugation. Still another means for effecting the phase separation is by diluting the solvent dispersion by addition of solvent, e.g., xylene, by means of process line 38. The phase separation can also be accomplished by subjecting the solvent dispersion to high shear mixing. In any event, after treatment, the solvent dispersion is subjected to settling and decantation or centrifugation (by conventional means not shown). Regardless of the phase separation means employed, it is important to retain at least a small amount of the solvent, e.g., xylene, in the inverted sludge. Suitable amounts include between about 0.2 and about 2, preferably between about 0.5 and about 1 parts by weight solvent per part of polymer solids.

As previously indicated, the supernatent liquid comprising the solvent and most of the emulsifying agent is withdrawn from the separator 36 by means of line 40 and the solvent is passed to a recovery system 42 which includes a liquid-liquid separator wherein the organic solvent is separated from residual water and catalyst and recycled by means of line 44 for admixture with a solvent make-up present in line 10. Thus, in this manner, the solvent or external phase may be easily recovered without the use of exotic recovery equipment normally associated with the collection of volatilized solvents, and may be easily recycled for reuse in the process. Water is withdrawn from recovery system 42 by means of line 46 and may be subjected to waste treatment for recycle of the water for use in the process, or alternatively, the water may be passed to disposal.

The resultant inverted sludge containing solid polymerized particles is withdrawn from the separator 36 by means of line 48, and the particles may be passed by means of valve 50 and line 52 to drier 54 wherein residual solvent is removed and the particles are obtained in line 56 in a dry randomly agglomerated form. If the acidic catalyst present in the inverted sludge in line 52 is neutralized by addition of a base, such as an alkali metal hydroxide, such as sodium hydroxide, introduced by means of line 53, the resultant dried particles are substantially discrete when removed from drier 54. The resultant particles have an average particle size of below about 2 microns, preferably between about 0.5 and about 1.0 microns and may be employed as opacifying pigments, to provide a relatively hihg opacity in the form of an opaque coating which is white, in the case of urea-formaldehyde.

According to another and more preferred aspect of the present invention, the solid polymeric particles present in the inverted sludge are withdrawn from separator 36 by means of line 48, three-way valve 50 and, line 58 and are passed to solvent removal tank 60, wherein an aqueous liquid such as water is introduced by means of line 62 for diluting the inverted sludge and further removal of the water-immiscible organic solvent. The polymeric particles in vessel 60 are subjected to agitation and heating either directly employing live steam or indirectly using conventional heating means to a temperature in the range of between about 120° and about 250° F, preferably between about 190° and about 212° F for the removal of residual solvent by steam distillation, and to provide additional acid-catalyzed curing of the polymeric particles. Surprisingly, under the influence of shear, acid and heat redispersion of the polymeric particles in the aqueous medium results in the formation of substantially spherically agglomerated opacifying particles whrein the walls of the particles are themselves formed of microspheres. Temperatures, for example, in the range of between about 120° and about 250° F are utilized to "set" the spherical agglomerate structure. Once the formation of spherically agglomerated opacifying particles has been achieved, residual oily solvent can be removed at lower temperatures under reduced pressure if desired, with no impairment of the opacifying power of the final product. The resulting agglomerated particles are illustrated in FIG. 2 of the drawings.

Alternatively, the solvent dispersion from the Reactor 30 can be discharged through line 34 through valve 35 and line 39 to line 58 and into vessel 60 where water is added (line 62) and the mixture agitated under high shear to form an oil-in-water emulsion. The oily solvent is then removed by steam distillation, as described in the preceeding paragraph, to produce the spherically agglomerated particles illustrated in FIG. 2.

Figure 2:
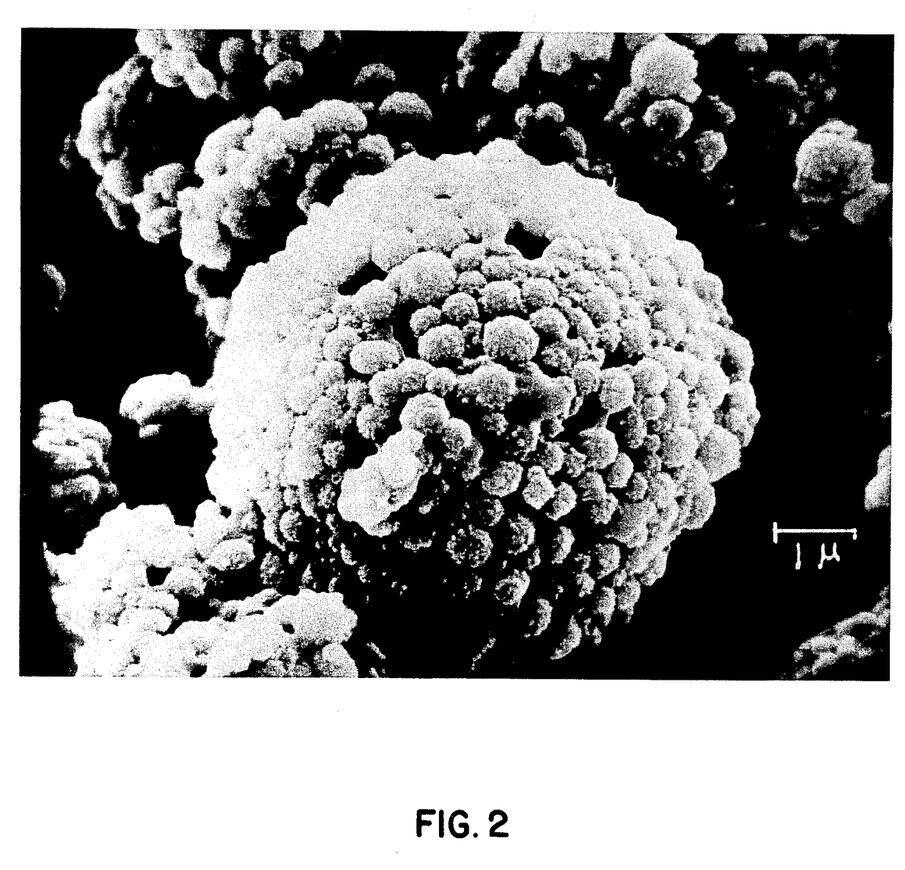

FIG. 2 is a photomicrograph illustrating the nature of a preferred opacifying particle of the present invention which may be termed a "super-agglomerate", since it is composed of a substantially spherical, discontinuous shell formed of agglomerated secondary particles, which are substantially spherical and substantially solid throughout and which are themselves formed of clusters of substantially spherical primary particles. As seen in FIG. 2, the super-agglomerate is hollow on the inside of the outer shell. Although it is not intended to limit the invention to any particular theory, it is believed that the secondary particles are derived from the polymerization of an aqueous prepolymer droplet. Thus, the size of the secondary particles is controlled by the droplet size of the initial water-in-oil emulsion droplets formed during the initial emulsification step. The aqueous redispersion system in vessel 60 involves an oil-in-water emulsion with the secondary particles concentrated at the solvent-water interface. The subsequent heating of this material during the initial phase of the distillation step results in the post-curing and fusion of the particles into a rigid substantially spherical structure.

Figure 3:
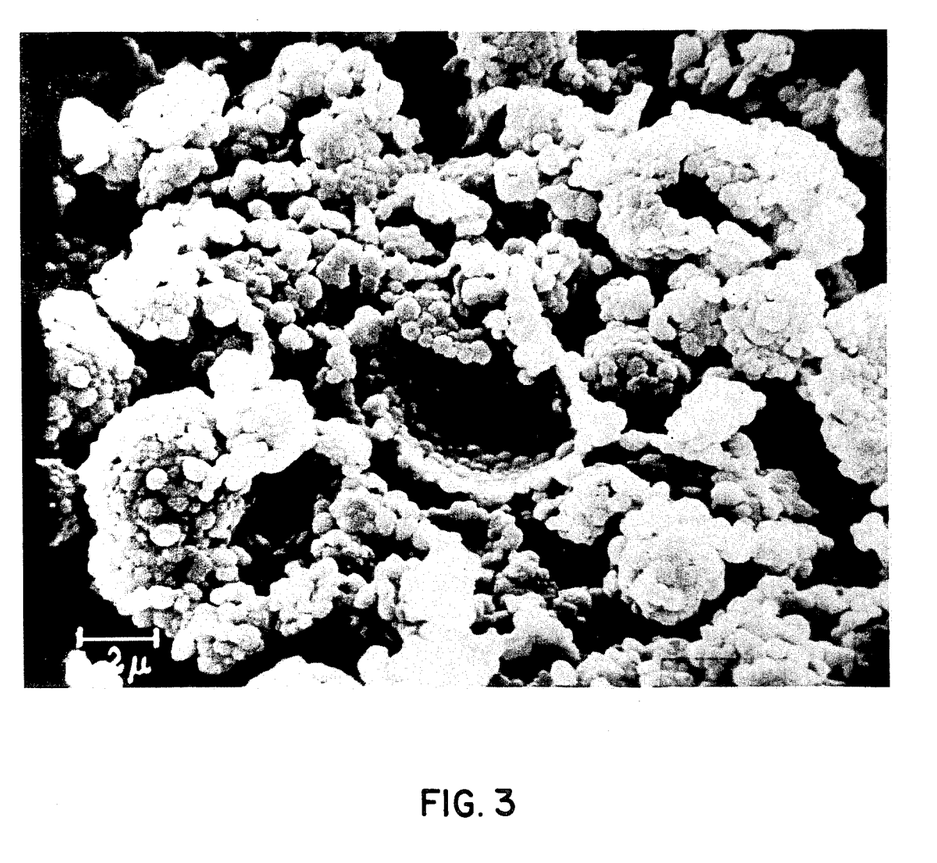
FIG. 3 is a sectional view, both enlarged, illustrating the physical structure of the agglomerated particles of the present invention.

The secondary particles are irregular and bumpy and are composed of smaller primary particles. Although the primary particles have been described as substantially spherical, with increased formaldehyde-to-urea ratio this differentiation becomes less distinct, so that the secondary particles have a smoother, only slightly pebbled surface. FIG. 3 is a sectional photomicrograph illustrating the interior of a super-agglomerate and demonstrates that the particles are hollow.

The super-agglomerate particles have an opacity which provides a two to three-fold increase of that of the discrete, substantially spherical secondary particles that are withdrawn by means of line 52, which particles have not been subjected to heating under shear. The super-agglomerates have an average particle diameter of between about 1 and about 20 microns, preferably between about 2 and about 7 microns. The secondary particles have an average diameter of between about 0.2 and about 1 micron.

Solvent vapor is steam distilled from the solvent removal vessel 60 in the form of a mixture of residual xylene with water by means of line 63 and passed through a condensor (not shown) and then on to join process line 40. Meanwhile, the aqueous dispersion of the substantially spherical agglomerates is withdrawn from vessel 60 by means of line 64 and valve 66 and is withdrawn by means of line 68. The aqueous slurry that is withdrawn by means of line 68 may be employed as a coating for the direct application of the opacifying agents onto the desired substrate, such as paper, with the incorporation of a suitable binder material. The resulting substrate is then dried under conventional paper drying conditions for removal of the moisture and the resulting coated substrate has a high degree of opacity. The Kubelka-Munk light scattering coefficient of such a coating formulated from 100 parts by weight of these pigment particles and 10 parts by weight of a conventional paper coating binder is between about 2,000 and about 6,000 cm² per gram. Likewise, the resulting slurry may be incorporated in a surface finish, such as paint, to provide a high degree of opacity thereto.

Alternatively, the aqueous slurry withdrawn from vessel 60 by means of line 64 may be passed by means of line 70 to a solid-liquid separator 72, such as, for example, a centrifuge, for water removal by means of line 74, and the resultant particles may be passed by means of line 76 to dryer 54 in order to produce agglomerates in powder form. It has been found that the adjustment of the pH to a value greater than 8 prior to drying greatly facilitates the production of a free-flowing, non-caking powder during the drying process. The resultant polymeric opacifying agents may be incorporated in paint or may be redispersed in a suitable aqueous or non-aqueous liquid with the addition of a binder and employed in the coating of paper or some other substrate, such as plastic, fabric or textile webs wherein it is desired to increase the opacity of such substrate. If desired, the product from line 76 can be passed to line 77 to wash tank 78 for washing to remove residual emulsifying agents by resuspending it in additional water in vessel 78. The washed super-particles are then passed by means of line 79 to separator 72.

These organic opacifying pigment particles in the form of the aqueous slurry from line 68, the wet cake from line 76, or the dry powder from line 56 can also be added to paper furnish, that is, the slurry of cellulose pulp fibers, sizing agents and other additives, and used to produce paper by conventional papermaking techniques, providing a paper with greatly increased opacity.

The following examples illustrate the production of the opacifying pigments of the present invention and constitute the best modes contemplated for carrying out the present invention.

EXAMPLE 1

Ninety grams of urea are added to a solution of 165 grams of 37% aqueous formaldehyde and 45 grams of water, adjusted to pH 9.3 with NaOH and heated for 1 hour at 65° C to yield a prepolymer solution containing about 50% solids. Using a Waring Blendor, 140 grams of this prepolymer solution are emulsified in a solution of 6 grams of a polyethylene oxide-polypropylene oxide block copolymer ("Pluronic L 122" from BASF-Wyandotte Company) emulsifier dissolved in 100 grams of toluene to produce a low-viscosity water-in-oil emulsion.

The emulsion then is treated with 4 milliliters of a 33% by weight solution of titanium tetrachloride in toluene, resulting in an exothermic reaction which raises the temperature from about 28° to about 50° C. After stirring for 2 hours, the resulting "solvent dispersion" consists of water droplets and solid polymer particles dispersed in the oil phase, with little or no tendency for coagulation of the polymer particles. This is separated into a clear supernatant phase, containing the oily solvent and some of the emulsifying agent, and a heavier phase, the "inverted sludge," containing about 40% solids and about 20% oily solvent. The phase separation is accomplished by centrifugation. The inverted sludge is redispersed in about 200 grams of water and is subjected to high-shear agitation while heating to steam distill off the oily solvent as a mixture with a portion of the excess water.

The resulting product is free of toluene and consists of an aqueous dispersion of 0.25 to 2 $\mu$ polymer particles, which have fused together into substantially spherical agglomerates (super-particles) 1 to 5 $\mu$ in diameter. The super-particles are made basic with ammonia and blended with a carboxylated styrene-butadiene rubber (SBR) latex paper coating adhesive (Dow 620 SBR latex, 10 parts by weight latex solids to 100 parts polymer solids) and coated on a paper substrate.

The Kubelka-Munk scatter coefficient of the paper coating is measured using a Huygen model 2100 digital opacimeter and computational methods described in the literature. A scatter coefficient of approximately 4000 cm²/gram is obtained. Formulated and coated under the same conditions, a water-dispersible paper-coating grade of anatase $TiO_2$ gives coatings with a scatter coefficient of 3,800 to 4,000 cm²/gram.

EXAMPLE 2

Two hundred grams of a prepolymer solution prepared by heating 165 grams of 37% aqueous formaldehyde, 45 grams of water, 89 grams of urea and 1 gram of melamine, adjusted to pH 9.3 with sodium hydroxide, at 70° C for 1 hour are emulsified in a solution of 6 grams of a polyethylene oxide-polypropylene oxide block copolymer attached to a central amine-functional group (Tetronic 1502 from BASF-Wyandotte Company), which acts as an emulsifying agent, dissolved in 100 grams of xylene. 0.06 milliequivalents of sulfur dioxide (as a 4 normal solution in xylene) are added to the water-in-oil emulsion, resulting in a temperature rise from about 28° to about 48° C. After 1 hour the resulting solvent dispersion is centrifuged, the inverted sludge phase is mixed with water and steam distilled under high-shear agitation. The product is free of residual xylene, and a coating on paper, prepared as described in Example 1, has a scatter coefficient of about 4,500 cm$^2$/gram.

EXAMPLE 3

A urea-formaldehyde-melamine prepolymer solution is prepared from 165 grams of 37% aqueous formaldehyde, 45 grams of water, 89 grams of urea and 1 gram of melamine, adjusted to pH 9.3 and heated for 1 hour at 65° C. 170 grams of this prepolymer solution are emulsified in a solution of 6 grams of Tetronic 1502 dissolved in 100 grams of xylene, and 0.06 milliequivalents of sulfur dioxide (about 4 normal in xylene solution) is added, resulting in an exothermic reaction. After stirring for 1 hour, the solvent dispersion has little or no precipitate. Without any preliminary phase separation, the product is mixed with water to give about 16% total solids, and this "aqueous redispersion" is steam distilled under high-shear agitation to yield a product free of residual xylene, closely resembling that described in Example 1. A paper coating prepared as described in Example 1 has a scatter coefficient of about 4,000 cm$^2$/gram.

The aqueous dispersion of spherical agglomerates is centrifuged, the aqueous supernatant phase is decanted, the precipitate is mixed with fresh water at about 10% solids and stirred for 1 hour. The washed product is concentrated by centrifugation and formulated into a paper coating as described in Example 1. A scatter coefficient of about 4,800 cm$^2$/gram is observed.

EXAMPLE 4

Eighty grams of a urea-formaldehyde prepolymer solution prepared as described in Example 1 are emulsified in a mixed emulsifier solution of 4 grams of Pluronic L 122, 2 grams of sorbitan monooleate (Span 80 from ICI America), 1 grams of Pluronic L 63 (a lower molecular polyethylene oxide-polypropylene oxide than Pluronic L 122, containing a higher percent polyethylene oxide) and 100 grams of xylene. The resulting water-in-oil emulsion is treated with 2 milliliters of a 50% (by weight) solution of monobutyl acid phosphate in xylene and stirred for 2 hours. The resulting solvent dispersion is centrifuged, and the heavier inverted sludge phase is dried in an oven at 80° C to obtain a material free of solvent. This is redispersed in water made basic with ammonia and mixed with an SBR latex adhesive (10 parts latex solids to 100 parts polymeric opacifier solids) to give a coating which exhibits a scatter coefficient of about 2,000 cm$^2$/gram.

EXAMPLE 5

One-hundred grams of a urea-formaldehyde prepolymer solution, prepared as described in Example 2, are emulsified in a solution of 2 grams of stearic acid diethanolamide (Schercomid ST from Scher Bros., Inc.) dissolved in 100 grams of xylene. Four milliliters of a 33% by weight solution of titanium tetrachloride in xylene are added, the exothermic reaction occurs and the dispersion is stirred for 2 hours. The product is centrifuged, and the heavier inverted sludge phase is mixed with about 200 grams of water and steam distilled under high-shear agitation. A coating prepared from the solvent-free product as described in Example 1 has a scatter coefficient of about 3,000 cm$^2$/gram.

EXAMPLE 6

One-hundred forty grams of a prepolymer solution prepared as described in Example 2 are emulsified in a solution of 6 grams of tall oil fatty acid diethanolamide (Schercomid TO-1 from Scher Bros., Inc.), dissolved in 100 grams of a chiefly aliphatic solvent (Shell-Sol 70 from Shell Oil Co., 98% saturates, 2% olefins and aromatics; initial boiling point 160° C, end point 180° C). Seven milliliters of about 4 normal sulfur dioxide in xylene solution are added to the water-in-oil emulsion, resulting in a temperature rise from about 30° to about 50° C. After stirring for about 2 hours, there is no significant precipitate. The emulsion is centrifuged for 45 minutes, and the inverted sludge is redispersed in about 200 grams of water containing 2 grams of polyoxyethylene sorbitan monolaurate (Tween 20 from ICI America). The organic solvent is distilled off under high-shear agitation to give polymeric opacifiers which are formulated into a paper coating as described in Example 1. This has a scatter coefficient of about 1,400 cm$^2$/gram.

EXAMPLE 7

A urea-formaldehyde prepolymer solution is prepared by heating an aqueous solution of 220 grams of 37% formaldehyde and 82 grams of urea, adjusted to pH 8 with triethanolamine, at 70° C for 1 hour. Fifty grams of this prepolymer solution are mixed with 30 grams of a 50% by weight dispersion of titanium dioxide in distilled water, and adjusted to pH 6 with dilute sulfuric acid. The aqueous dispersion is emulsified in a solution of 6 grams of Pluronic L122, 3 grams of sorbitan monooleate (commercially available as Span 80 from ICI America) and 1.5 grams of a poly(oxyethylene-poly(oxypropylene) block copolymer with 30% poly(oxyethylene) and a molecular weight of about 2500 (commercially available as Pluronic L63) in 100 grams of xylene to yield a water-in-oil emulsion. This is treated with 4 milliliters of a 50% by weight solution of monobutyl acid phosphate in toluene and stirred for 2 hours.

The solids are separated from the continuous phase by centrifugation and dried at 80° C in a forced draft oven. The residue is redispersed in water, yielding discrete, spherical particles averaging 2–2 microns in diameter, with titanium dioxide particles clearly visible inside each sphere. No free titanium dioxide is discernable in the aqueous phase at 1000X magnification.

The aqueous dispersion is formulated with a latex adhesive as described in Example 1 and coated on paper to yield a scatter coefficient of about 1700 cm$^2$/gram. Electron micrographs of the dry product show approximately spherical particles; X-ray analysis of single particles on a scanning electron microscope show high titanium loading.

EXAMPLE 8

A urea-formaldehyde prepolymer is prepared in a continuous manner by blending together a stream of 37% aqueous formaldehyde, adjusted to pH 9.5 with sodium hydroxide and a stream of 67% aqueous urea, heated to 65° C to prevent crystallization, in a ratio corresponding to a formaldehyde to urea ratio of 1.3 to 1, and then passing this mixture through a heated coil at a temperature of about 95° C, with a residence time in the reactor of about 3 minutes. Upon leaving the heated reactor coil the prepolymer solution is cooled in a heat exchanger and then emulsified in a solution of 6 parts of Tetronic 1502 in 100 parts xylene, in a ratio of 140 parts of prepolymer solution to 100 parts of xylene. The resulting emulsion is cooled to about 20° C in a heat exchanger and then passed into a mixing zone where 0.06 milliequivalent of sulfur dioxide is added to about 250 parts of the emulsion. The catalyzed emulsion passes through a tube reactor and, after a reactor residence time of about ½ hour, is steam distilled with excess water under high-shear. Coatings prepared from the product and from washed product as described in Examples 1 and 3 have scatter coefficients of about 4000 and about 5000 cm$^2$/gram, respectively.

EXAMPLE 9

Paper handsheets were prepared using microcapsular opacifiers prepared as described in Example 1 and anatase titanium dioxide as fillers, added to the furnish to enhance opacity and brightness.

Three samples of a 300 gram "air dry" mixture of 50% pine and 50% hardwood pulps, each, were disintegrated in a dynapulper and were refined in a valley beater to a Canadian Standard Freeness of 250 – 350. After each batch was pressed and shredded individually, the 3 batches were combined and the composite was shredded until a 10.0 gram sample gave a Canadian Standard Freeness of 275 – 325. Moisture of the composite was obtained by dispersing several 10.0 gram samples in 100 milliliters of distilled water under a Hamilton Beech dispersator for 2–3 minutes, forming pads in a Buchner Funnel, drying the pads on a hot plate, and calculating the percentage moisture. This result was used to calculate "bone dry" weights of fiber for paper furnish formulations.

Nine handsheets were prepared for each of the filler pigment samples (3 at 5, 10, and 15% as bone dry weight, respectively) by weighing out 3.0 grams "bone dry" samples of fiber into plastic bottles, adding the appropriate weight of filler (0.15, 0.30, and 0.45 grams "bone dry") as necessary, diluting with distilled water to 110 milliliters total volume, dispersing under the Hamilton Beech dispersator for 3 minutes, and forming in a Noble and Wood sheet mold, with the following results.

| Description | G. E. Brightness F/W | Tappi Opacity |
|---|---|---|
|  | 78.9/79.7 | 76.6 |
| 5% TiO$_2$ | 81.4/82.2 | 81.1 |
| 10% TiO$_2$ | 82.9/83.6 | 84.5 |
| 15% TiO$_2$ | 84.1/85.4 | 87.1 |
| 5% microcap. opac. | 81.5/82.2 | 80.5 |
| 10% microcap. opac. | 83.7/85.2 | 84.6 |
| 15% microcap. opac. | 84.5/86.1 | 86.6 |

The microcapsular opacifiers compared favorably with anatase titanium dioxide in this application.

EXAMPLE 10

A sample of an aqueous dispersion of microcapsular opacifiers prepared as described in Example 2 (coating scatter coefficient about 4500 cm$^2$/gram) is adjusted to pH 8.3 with sodium hydroxide and heated to dryness in an 80° C forced draft oven. Ten grams of the dry powder are dispersed in 50 grams of water, adjusted to pH 9 with ammonia and treated with 2 grams of Dow 620 latex (about 50% solids) to give a paper coating which had a scatter coefficient of about 4700 cm$^2$/gram.

What is claimed is:

1. A process for the formation of opacified paper sheet, which comprises admixing cellulosic fibers and opacifying agents consisting essentially of substantially spherical aldehyde condensation polymeric super-particles, each of said super-particles having a substantially spherical, discontinuous shell composed of agglomerated, discrete, aldehyde condensation polymeric secondary particles, said shell surrounding a substantially spherical hollow core, said secondary particles being substantially spherical and substantially solid throughout, and forming said admixture into a paper sheet.

2. The process of claim 1 wherein said super-particles have an average diameter of between about 1 and about 20 microns and said secondary particles have an average diameter of between about 0.2 and about 1 micron.

3. The process of claim 2 wherein said super-particles have an average diameter of between about 2 and about 7 microns.

4. The process of claim 1 wherein said secondary particles are formed of urea-formaldehyde or phenol-formaldehyde.

5. The process of claim 4 wherein said secondary particles are formed of urea-formaldehyde.

6. The process of claim 5 wherein said particles additionally comprise melamine.

7. The process of claim 1 wherein said secondary particles additionally comprise TiO$_2$.

8. The process of claim 1 wherein said secondary particles additionally comprise clay.

9. A paper sheet consisting essentially of cellulosic fibers having opacifying agents incorporated therein, said opacifying agents consisting essentially of substantially spherical aldehyde condensation polymeric super-particles, each of said super-particles having a substantially spherical, discontinuous shell composed of agglomerated, discrete, aldehyde condensation polymeric secondary particles, said shell surrounding a substantially spherical hollow core, said secondary particles being substantially spherical and substantially solid throughout.

10. The sheet of claim 9 where said super-particles have an average diameter of between about 1 and about 20 microns and said secondary particles have an average diameter of between about 0.2 and about 1 micron.

11. The sheet of claim 10 wherein said super-particles have an average diameter of between about 2 and about 7 microns.

12. The sheet of claim 9 wherein said secondary particles are formed of urea-formaldehyde or phenol-formaldehyde.

13. The sheet of claim 12 wherein said secondary particles are formed of urea-formaldehyde.

14. The sheet of claim 13 wherein said particles additionally comprise melamine.

15. The sheet of claim 9 wherein said secondary particles additionally comprise TiO$_2$.

16. The sheet of claim 9 wherein said secondary particles additionally comprise clay.

17. A paper sheet consisting essentially of cellulosic fibers having opacifying agents coated thereon, said opacifying agents consisting essentially of substantially spherical aldehyde condensation polymeric super-particles, each of said super-particles having a substantially spherical, discontinuous shell composed of agglomerated, discrete, aldehyde condensation polymeric secondary particles, said shell surrounding a substantially spherical hollow core, said secondary particles being substantially spherical and substantially solid throughout.

18. The paper sheet of claim 17 wherein said super-particles have an average diameter of between about 1 and about 20 microns and said secondary particles have an average diameter of between about 0.2 and about 1 micron.

19. The paper sheet of claim 18 wherein said super-particles have an average diameter of between about 2 and about 7 microns.

20. The paper sheet of claim 17 wherein said secondary particles are formed of urea-formaldehyde or phenol-formaldehyde.

21. The paper sheet of claim 20 wherein said secondary particles are formed of urea-formaldehyde.

22. The paper sheet of claim 21 wherein said particles additionally comprise melamine.

23. The paper sheet of claim 19 wherein said secondary particles additionally comprise $TiO_2$.

24. The paper sheet of claim 17 wherein said secondary particles additionally comprise clay.

* * * * *